United States Patent [19]
Bonne

[11] 4,046,456
[45] Sept. 6, 1977

[54] ELECTRO-OPTIC CELL WITH TRANSVERSE ELECTRIC FIELD

[75] Inventor: Ulrich Bonne, Hopkins, Minn.

[73] Assignee: Honeywell Inc., Minneapolis, Minn.

[21] Appl. No.: 679,280

[22] Filed: Apr. 22, 1976

[51] Int. Cl.² .......................... G02F 1/28; H01V 7/00
[52] U.S. Cl. .................................. 350/160 R; 310/357;
350/161 R; 350/267
[58] Field of Search ............... 350/160 R, 161 R, 267;
310/9.5

[56] References Cited
U.S. PATENT DOCUMENTS

| | | | |
|---|---|---|---|
| 3,527,525 | 9/1970 | Marks | 350/160 R |
| 3,562,792 | 2/1971 | Berlincourt et al. | 310/9.5 |
| 3,848,964 | 11/1974 | Marks | 350/160 R |

Primary Examiner—Stanley D. Miller, Jr.
Attorney, Agent, or Firm—Omund R. Dahle

[57] ABSTRACT

This disclosure is directed to an electro-optic cell construction of the type which employs a layer of minute dipole particles in a suspension carried between two transparent sheets for use as an electro-optic light controlling device such as a shutter, or the like. In combination with the dipole particle containing fluid chamber are optically transparent piezoelectric transformer elements for causing a transverse electric field in the fluid chamber to increase the speed of response of the shutter action.

5 Claims, 2 Drawing Figures

4,046,456

ELECTRO-OPTIC CELL WITH TRANSVERSE ELECTRIC FIELD

BACKGROUND AND SUMMARY OF THE INVENTION

This invention relates to electro-optic shutters employing a suspension of dipole rod-like particles oriented for light transmission or rejection by an electric field. The term electro-optic shutter is intended to include more generally electro-optic cells useful for variable density filters, light choppers, displays, controllable polarizers and the like. Electro-optic fluid shutters have found a place in the art and representative are various Marks U.S Pat. Nos. 3,848,964, 3,527,525, RE 28,211, 3,512,876, 3,341,274, 3,257,903. Often discussed in these references is the problem of response time: although the dipole particles respond rapidly to an applied field and are oriented to provide a transparent window, the opaquing of the window tends to be slow by comparison since the dipole rods must move into random orientations by Brownian motion. Several of the references, for example, U.S. Pat. No. 3,848,964, describe forced disorientation by multi-electrode structure in the cell to which voltage pulses are applied generating a transverse electric field to provide a uniform positive disorientation of the dipoles. A limitation of this approach is that the transmittance of the panel depends on the proportion of the area taken up by the electrode lines as compared to the space between the lines. If the lines are far apart, the applied voltage to the conductors must be high to attain the necessary transverse field strength to move the dipoles. As the lines are moved closer together, the transmittance decreases.

In the present invention, the transverse electric field in the fluid shutter is provided by optically transparent piezoelectric transformer elements. A relatively low voltage such as 100 volts can be used to energize the piezoelectric voltage step-up transformer which then provides a combination of transverse electric field and motion to rapidly reduce the longitudinal alignment of the dipoles and the second transmitter of the cell.

DESCRIPTION

Figure 1:
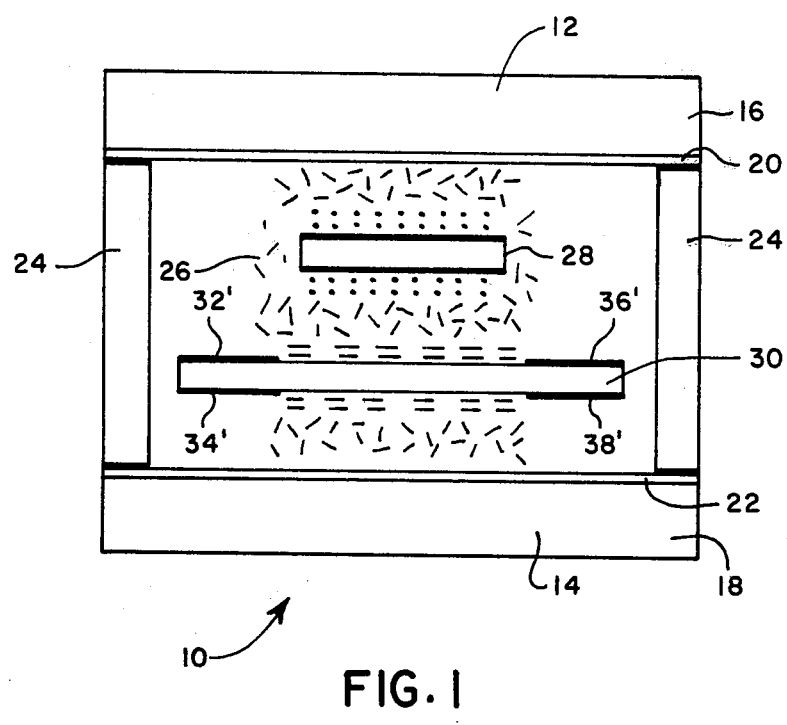
FIG. 1 shows an electro-optic cell using a pair of PLZT optically transparent piezoelectric transformers located in the fluid suspension of dipole particles.

Referring now to the drawings wherein like numerals are used in each of the Figures, there is shown generally at 10 an electro-optic cell having upper and lower transparent plates 12 and 14, the transparent plates comprising substrates 16 and 18, respectively, such as glass, and transparent electrodes 20 and 22. Edge member 24 is sealed to the plates 12 and 14 to complete the cell chamber. Within the chamber is a fluid 26, such as VARAD fluid, having in suspension dipole particles, and also two piezoelectric transformer elements 28 and 30.

Element 28, and also element 30, is a single- or polycrystalline ferroelectric piezoelectric and optically transparent material such as quartz, barium titanate, lithium niobate, Rochelle salt, ammonium dihydrogen phosphate (ADP) or lanthanum modified lead-zirconate titanate (PLZT) of various compositions. It is operated as a piezoelectric voltage step-up transformer. The operation of a piezoelectric transformer of this general type using PZT is taught, for example, in the Berlincourt U.S. Pat. No. 3,562,792. In one successful embodiment of my invention involving PLZT, the optically transparent element 28 is approximately 4 cm long by 2 cm wide and has a thickness of one millimeter. The resonant frequency is ≃ 40 kilohertz. The piezoelectric body has different portions polarized differently. A portion of the body at both ends in the area of the electrodes may be polarized transversely while the extended central portion of the body is polarized longitudinally. The longitudinally polarized portion is the high voltage secondary of the transformer and may provide a voltage gain of 10 to 200 times. In the sample described, it was about 100 times. Thus, if the primary electrodes are energized with about 100 volts, the voltage in the central area of the body with respect to the ends will be about 10,000 volts. The field generated by this high voltage and the associated transformer motion (40 kHz vibration) are sufficient to quickly eliminate the longitudinal alignment of the dipoles which are nearby the transformer element. Electrical contact is made to the transformer at metal film electrodes 32, 34, 36, and 38. To energize the transformer an alternating voltage V is connected across electrodes 32 and 34 and across 36 and 38. The voltage step-up transformer action results in a high voltage being generated in the central section of the element. Piezoelectric transformer element 30 is mounted at right angles to element 28, the two elements operating as polarizers when energized.

Figure 2:
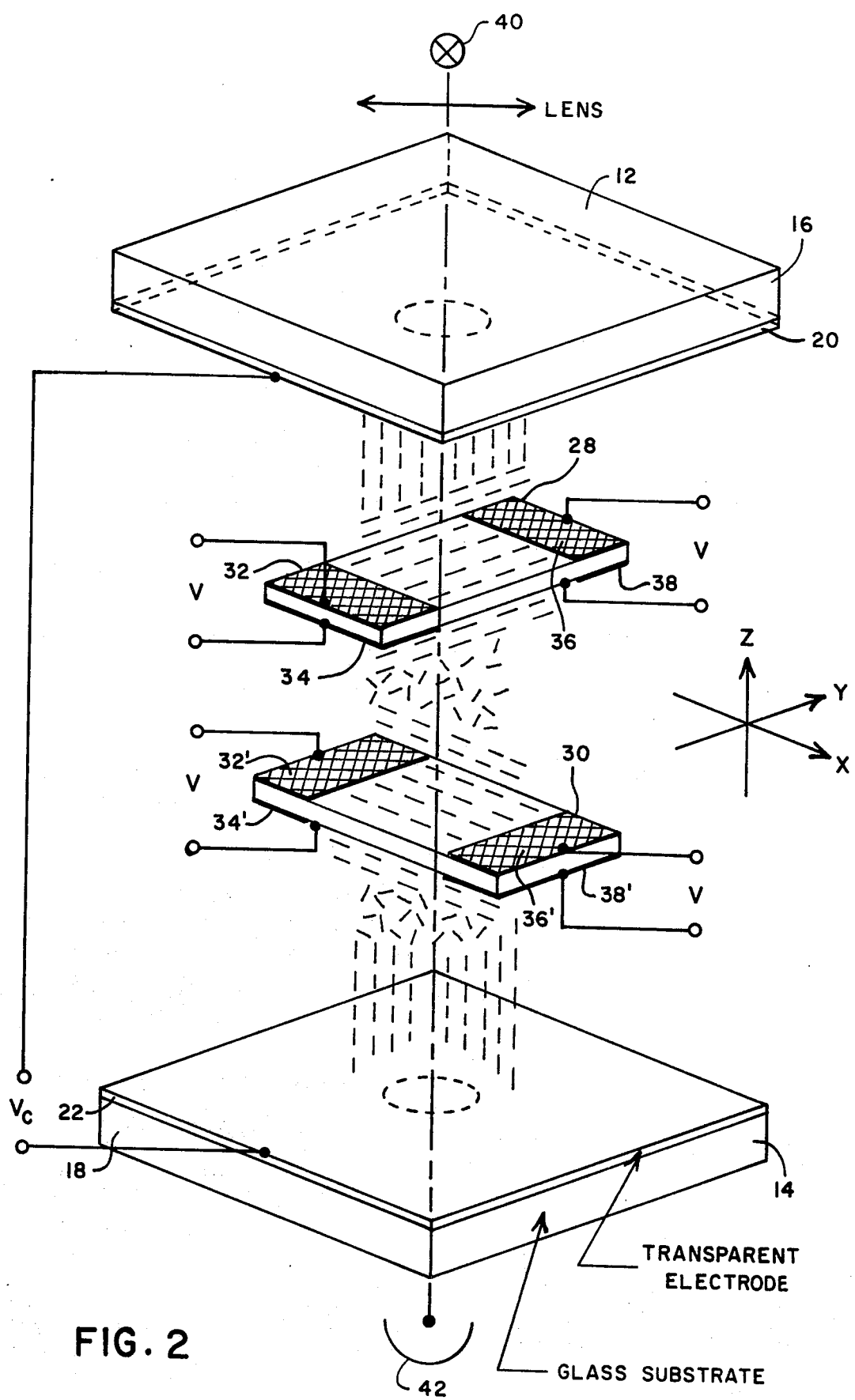
FIG. 2 shows an exploded view of the electro-optic cell of FIG. 1.

The mounting means (not shown in FIGS. 1 and 2) of the piezoelectric transformers in the chamber may be a foam rubber mounting and the foam rubber mounting may or may not be located at a displacement node of the transformer depending on whether the transformer is driven at a fundamental or higher harmonic.

When the dipole particles are free to move within the chamber, they respond to Brownian motion and become randomized so that the shutter is opaque. When a voltage $V_c$ is applied to electrodes 20 and 22 imposing an electric field in the cell, the dipole particles become aligned with their long direction parallel to the electric field (the Z direction) and normal to the plates 12 and 14. The shutter then becomes transparent and transmits light from a suitable light source 40 through the shutter to a light detecting means 42. When the voltage $V_c$ is removed, the orientation of the dipole particles will again become randomized but as has been discussed above, the time interval for this to occur is longer than desired. In the present invention, when $V_c$ is removed, V is applied to energize the piezoelectric transformers 28 and 30. The resulting high voltages generated are effective to align dipoles in X and Y directions. As soon as the PLZT element 28 begins to vibrate, piezoelectric effects generate an electric field, $E_y$, and the particles of the fluid adjacent element 28 will align themselves in the y-direction. Similarly, element 30 begins to vibrate and the piezoelectric effects generate an electric field $E_x$, and the dipole particles in the fluid adjacent element 30 will align themselves in the x direction. This provides a rapid opaquing of the shutter.

The embodiments of the invention in which an exclusive property or right is claimed are defined as follows:
 1. A light controlling device comprising:
    a pair of spaced transparent plates presenting a light path through said plates;

a transparent fluid suspending medium between said plates;

a plurality of elongated dipoles freely carried within the fluid medium;

first means for applying an electric field in a direction parallel to said light path to orient said dipoles parallel to said light path, thereby rendering transparent said light controlling device; and optically transparent piezoelectric transformer means in said fluid between said plates, and connection means from said transformer means adapted for connection to a source of electrical power for energizing said piezoelectric transformer means, said transformer means being so oriented in said fluid that when energized generating a transverse electric field and motion to orient said dipoles orthogonal to said light path to render opaque said light controlling device.

2. The invention according to claim 1 in which said piezoelectric transformer means consists of one piezoelectric transformer in said fluid.

3. The invention according to claim 1 in which said piezoelectric transformer means comprises a first and a second piezoelectric transformer in said fluid, said first and second piezoelectric transformers being positioned orthogonal to one another and each generating a transverse electric field orthogonal to the other and also orthogonal to said light path.

4. The invention according to claim 3 in which the first and second piezoelectric transformers are positioned in said device so that a light path through said plates also passes sequentially through said first and second piezoelectric transformers.

5. The invention according to claim 1 in which said optically transparent piezoelectric transformer means is a material of the group consisting of quartz, barium titanate, lithium niobate, Rochelle salt, ammonium dihydrogen phosphate (ADP) and lanthanum PLZT.

* * * * *